April 29, 1958    I. W. LOVELADY ET AL    2,832,431
EMULSION TREATER
Filed May 27, 1954    3 Sheets-Sheet 2
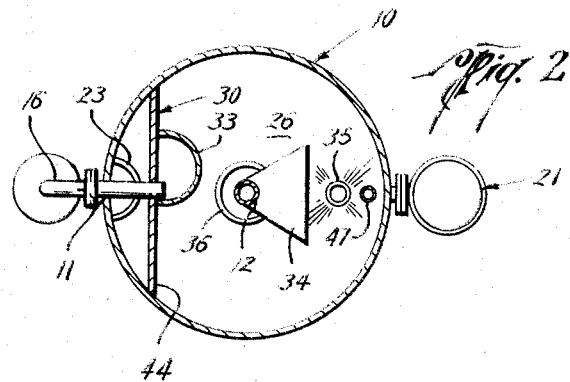
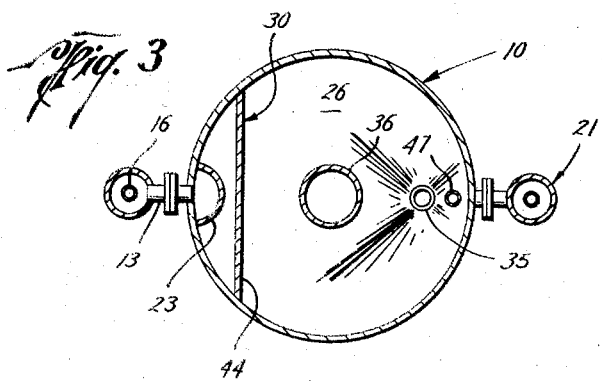
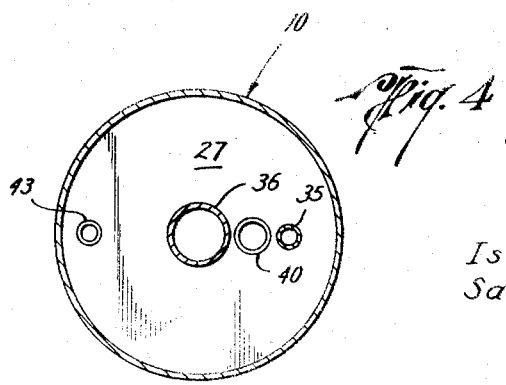
Isaac W. Lovelady
Sanford P. Kroeker
INVENTORS
BY
Browning, Simms & Hyer
ATTORNEYS

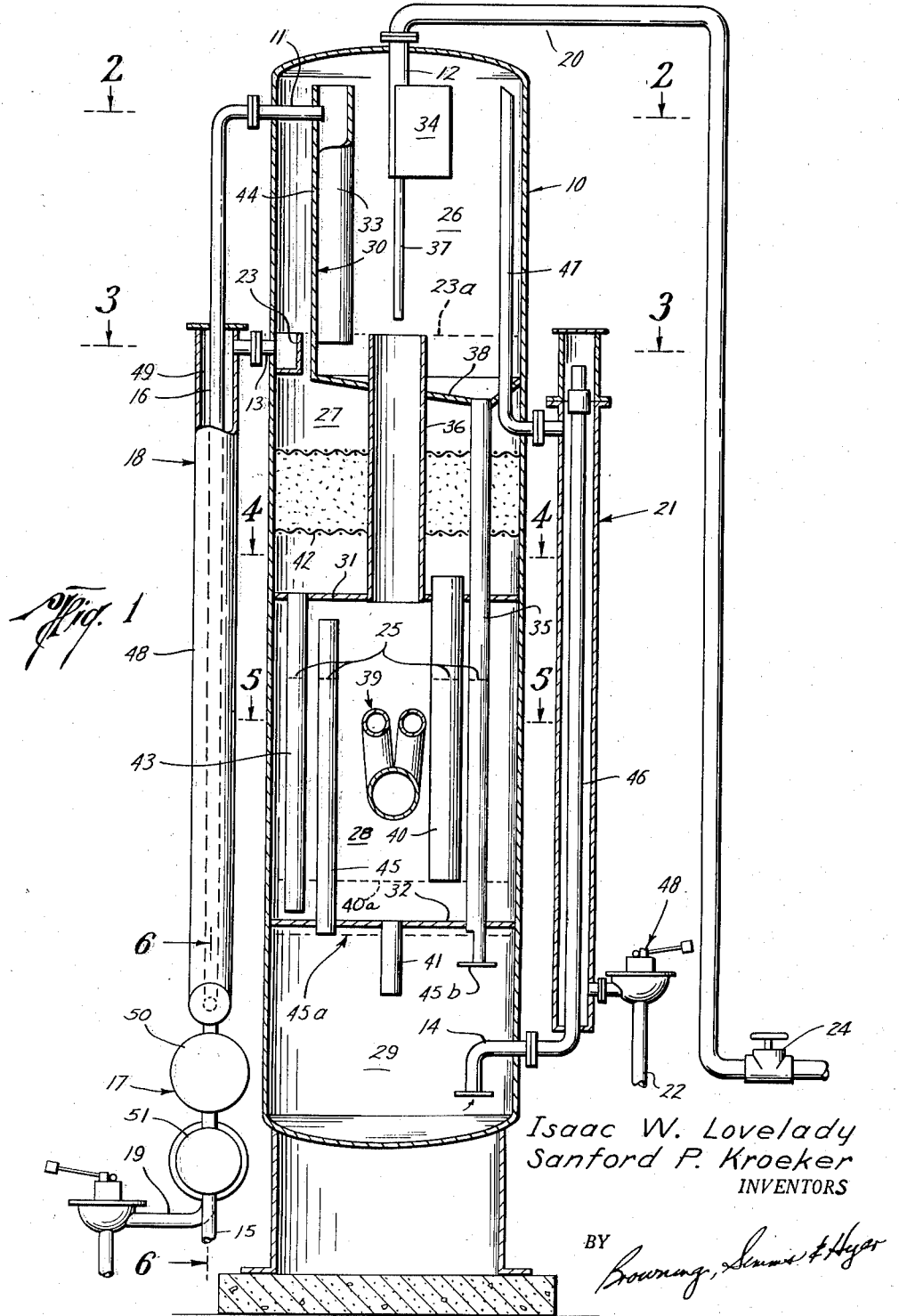

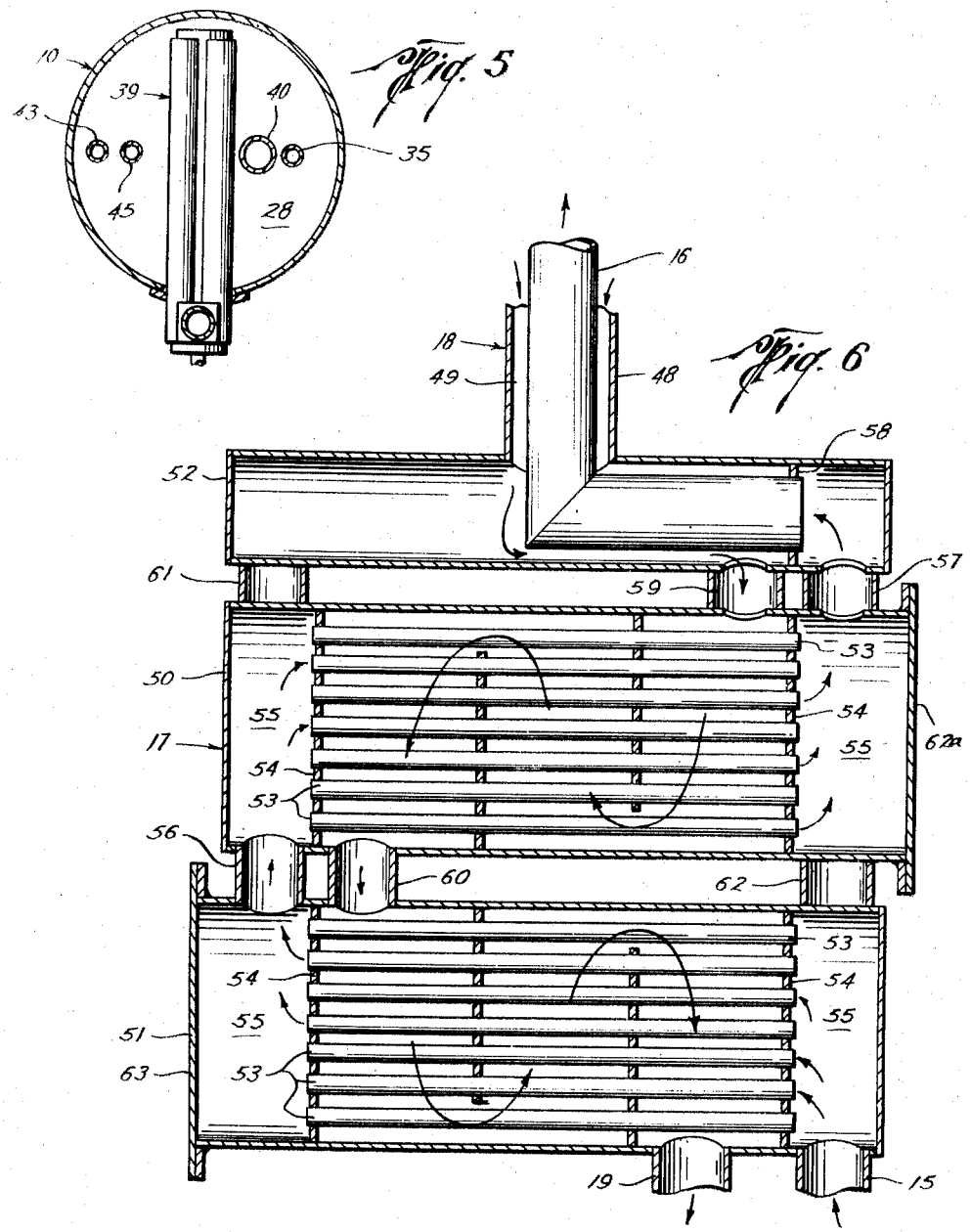

United States Patent Office 2,832,431
Patented Apr. 29, 1958

2,832,431

EMULSION TREATER

Isaac W. Lovelady and Sanford P. Kroeker, Odessa, Tex., assignors to Sivalls Tanks, Inc., Odessa, Tex., a corporation of Delaware Application May 27, 1954, Serial No. 432,783

12 Claims. (Cl. 183—2.7)

This invention relates to the treatment of mixtures such as gas and two or more liquids. More particularly, this invention relates to a treater especially well adapted for the separation of well fluids into oil, gas and water phases.

In many instances, well fluids from oil and gas wells consist of a mixture of oil, emulsion, water and natural gas. The water is often in an emulsion known as a "tight" emulsion which is difficult to separate into oil and water. In most cases, however, the well fluids also include portions which may be termed "free water" in an emulsion which may be easily broken up to separate the water by agitation and gravity settling.

The tight emulsions require heating for effective separation and many treaters have been designed for this purpose. Such treaters heretofore employed, however, are wasteful from a fuel standpoint as their construction is such that not only the tight emulsion but also at least a substantial portion of the free water is heated.

It is conventional practice in vertical treaters of this general type to conduct the fluids downwardly in a tank or vessel and direct their flow to a point where they may flow upwardly over a heater in the tank and thereby effect separation of the fluids into their oil and water phases. After heating, the separated phases may settle in a relatively quiescent zone above the heater for effecting further separation prior to disposal from the tank. It will also be understood that heating of the well fluids will also release a certain amount of gas, which naturally bubbles up through and agitates the settling fluids, thereby upsetting the quiescence essential to efficient gravity separation.

It has been found that flow of the liquids over the heater in this conventional manner results in an unusually high rate of deposition of lime and other caking material on the heater surfaces. As the deposits pile up, heat transmission across the walls of the heater becomes more difficult such that the deposits act as an insulating medium. As these deposits continue to build up, the temperature of the steel walls increases and the steel is weakened to a point of structural failure. As well, the increased temperatures result in more rapid and virulent corrosion of the heater walls. Frequent servicing for cleaning purposes is required to prevent these burnouts and corrosion.

This high rate of deposition is thought to be due principally to the direction of the flow of liquid upwardly over the heater. That is, water rather than oil is known to be the source of carbonaceous deposits and, since the water is first flowed upwardly over the heater and then settles downwardly thereover after separation from the oil, it will be appreciated that considerable time is permitted in which deposits may form. The present invention is directed at least in part to the solution of this problem. More particularly, it is an object of this invention to provide a vertical emulsion treater in which emulsion is caused to flow downwardly over the heating element, thereby greatly reducing the water contact therewith and consequent deposits thereon.

Another object is to provide a vertical treater requiring only a minimum of fuel for effective separation of emulsion of the type heretofore mentioned.

Yet another object is to provide a vertical emulsion treater in which "free water" may be separated from the "tight emulsion" prior to heating thereof and conducted in by-passed relation to the heated emulsion to a settling chamber prior to disposal from the heater.

Still another object is to provide a vertical treater of the type employing a heating chamber for breaking tight emulsion in well fluids, in which provision is made for gravity settling of the water phase of the fluids beneath the heating chamber and in which the settling water may be insulated from the heating chamber to prevent its absorbing heat therefrom.

A further object is to provide a vertical emulsion treater in which heated liquid is contained above a heating chamber in a state of quiescence not heretofore possible in prior art structures.

Still a further object is to provide a vertical emulsion treater in which gas liberated from heated liquid may be conducted outwardly of the treater without agitating said liquid during settling within the treater.

A still further object of this invention is to provide a vertical emulsion treater constructed in a manner to reduce to a minimum the loss of light ends from the liquid, thereby enabling the saving of gravity of the crude.

A still further object is to provide a vertical emulsion treater in which gas separated by heating from the liquid of the well fluids is contacted by relatively cold liquid within the treater prior to its disposal therefrom, whereby light ends in the hot gas will be condensed and not lost with the gas leaving the treater.

A still further object is to provide an emulsion treater having means for causing the flow of liquids downwardly over a heating element therein and then into a settling chamber above the heating element, wherein the heated liquid in the settling chamber is exposed along only a small portion of its upper surface to reduce to a minimum the escape therefrom of hot vapors and consequent loss of light ends from the crude.

A still further object is to provide an emulsion treater in which liquids are caused to flow downwardly over a heating element and the hot vapors from the heated liquid are contacted prior to their disposal from the treater by cold vapors from the well fluids being introduced into the treater.

A still further object is to provide an emulsion treater in which cold well fluids are introduced into an upper chamber therein and then conducted downwardly therein to a point where they are flowed downwardly over a heating element and then permitted to settle thereabove prior to disposal from the treater, the upper chamber and outlet from the treater being so arranged as to cause a major portion of the heated liquid to contact the upper chamber during settling.

A still further object is to provide an emulsion treater having a portion therein for heating liquids of the emulsion to separate them into oil and water phases and another portion thereabove for containing the heated liquids in a relatively quiescent state to permit settling thereof, said treater having means to maintain an interface level between the separated oil and water below the settling portion, whereby the oil in said latter portion may settle in contact with the heating portion therebelow.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a vertical sectional view of the preferred embodiment of the treater of this invention, showing in connection therewith suitable level controlling and heat exchanging means;

Figs. 2 to 5, inclusive, are cross-sectional views of the treater, taken substantially along broken lines 2—2, 3—3, 4—4, and 5—5, respectively, of Fig. 1; and Fig. 6 is an enlarged longitudinal sectional view of the heat exchanger, taken substantially along broken line 6—6 of Fig. 1.

Turning now to a description of the embodiment of this invention illustrated in the drawings, it can be seen that the treater comprises a substantially upright cylindrical tank 10 which is closed except for an inlet 11 from the exterior of the tank, a gas outlet 12, an oil outlet 13, and a water outlet 14. Cold emulsion is taken from a suitable source through conduits 15 and 16, through the horizontal heat exchanger 17 and vertical heat exchanger 18, both of which will be described in more detail hereinafter, and into the inlet 11. The separated hot oil discharged from outlet 13 is conducted through the heat exchangers 17 and 18 in heat exchange and reversed flow relation with the above-mentioned cold emulsion to a suitable point of disposal through pipe 19. The separated gas, on the other hand, is conducted from outlet 12 through pipe 20 to a separate point of disposal, while separated water from the outlet 14 is conducted into and through a water siphon 21 from which it is further conducted into a pipe 22 to another point of disposal.

A liquid level 23a is maintained in the tank by a weir 23 disposed adjacent the oil outlet 13, while the desired pressure within the tank is maintained by a back pressure valve 24 in the gas pipe 20. The water siphon 21 is adjustable, in a manner to be described, for the purpose of maintaining an oil-water interface at a desired level within the tank such as, for example, the level indicated by broken lines at 25 in Fig. 1 of the drawings. As shown, this level is approximately the same in each of the pipes or conduits 35, 40, 43 and 45.

The tank is divided interiorly, and in successive downward arrangement, into a gas separating chamber 26, a settling chamber 27, a heating chamber 28, and a free water knockout chamber 29, said chambers being arranged in substantially superimposed relation. It can be seen that the gas separating chamber 26 is defined by the upper end of the tank and is separated on two sides from the settling chamber by a cold flume 30, to be described in particular hereinafter. The settling chamber 27 and heating chamber 28, on the other hand, are separated from each other by a plate or partition 31 extending across the cross section of the tank. Thus, as shown, the settling chamber 27 in effect serves as a partition between the gas separation and heating chambers. The heating chamber 28 and free water knockout chamber 29 are separated from each other by a second plate or partition 32 which also extends across the cross section of the tank, whereby the gas separation chamber is in effect also separated from the free water knockout chamber by a partition comprising the settling and heating chambers.

Cold emulsion, which has been heated to a certain extent in the heat exchangers, is introduced into the gas separation chamber 26 through the inlet 11. A centrifugal separator shell 33 is disposed within the gas separation chamber opposite the inlet 11 such that the incoming emulsion is directed tangentially against its arcuate inner periphery and initially separated into gas and liquid phases. The gas so separated flows upwardly through the shell and into a suitable mist extractor, illustrated diagrammatically at 34, from which it is conducted outwardly of the tank through the outlet 12, such that all gas leaving the treater must pass through the extractor.

The liquids, on the other hand, settle downwardly toward the lowermost portion of the flume in the gas separation chamber wherein they are contained in a relatively quiescent state. For this purpose, as can be seen from the drawings, the lower end of the separator shell 33 is disposed below the liquid level 23a in this chamber such that agitation of the liquids is reduced to a minimum. In so settling within the chamber 26, the liquids are caused to initially separate by gravity into oil and emulsion, or lighter liquid, and "free" water phases, the lighter liquid, of course, tending to assume a level above the water.

The water so separated is conducted downwardly through a pipe 35 directly into the free water knockout chamber 29 in by-passed relation to the settling and heating chambers, thus enabling the discharge of the free water into the chamber 29 with only a minimum of heat absorption. The separated oil and emulsion, or lighter liquid, is conducted downwardly through the enlarged pipe 36 through the settling chamber in by-passed relation thereto and into the heating chamber 28. This enlarged conduit is disposed beneath a drain back conduit 37 from the mist extractor so as to collect liquid separated in the extractor. It will be noted that the uppermost edge or inlet to the pipe 36 is on a level with the upper edge of the weir 23 such that with pressure equalization between the gas separation chamber and the portion of the settling chamber in which the weir is located, only the lighter liquid will spill over into the conduit 36. In this connection, the lower plate or wall 38 of the flume 30 is sloped downwardly from all points toward the inlet to the free water conductor pipe 35 such that the free water will quickly be discharged into the same.

The enlarged pipe 36, as shown, is terminated substantially flush with the plate 31 or upper wall of the heating chamber 28. Within the heating chamber and side mounted with respect to the tank is a heater, designated in its entirety by the numeral 39, which includes heating tubes and a fire tube connected in conventional fashion and disposed substantially beneath the outlet from the pipe 36 into the heating chamber. Outlets from the heating chamber 28 are provided through a pipe 40 and the water drain back pipe 41. The inlets to both of these outlet pipes 40 and 41 from the heating chamber are below the level of the burner or heater 39 such that the liquid conducted into the heating chamber through the pipe 36 is caused to flow downwardly over the heater prior to being discharged from the heating chamber. The oil-water interface in heating chamber 28 and exteriorly of pipe 40 will be maintained at approximately the lower end of pipe 40 as indicated by the numeral 40a to cause such downward flow over the heater.

The heating of the liquid will cause it to be broken down into its oil and water phases. More particularly, this phase of treatment is effective to break down the "tight" emulsion. The separated hot oil will seek its outlet through the pipe 40 through which it will travel upwardly into the settling chamber 27. The separated hot water, on the other hand, will settle downwardly through the drain back pipe 41 which, as shown, has its inlet in the heating chamber substantially flush with the bottom wall thereof or plate 32.

The hot oil is contained in the settling chamber 27 in a relatively quiescent state such that any water remaining therein will settle out, especially in view of an additional novel feature of this invention wherein the oil-water interface may be maintained as at 25 below the plate 31. In this manner, the settling oil may be maintained in contact with the plate 31 heated from the chamber 28. To promote additional separation, there is also disposed within the settling chamber a filter 42 of conventional form which extends entirely across the cross section of the tank.

The oil-water interface level intermediate the upper and lower extremities of the heating chamber, and indicated by the numeral 25, enables water settling out of the oil in the settling chamber to be drained back into the lower portion of the heating chamber through a water drain back pipe 43, enabling, as above-mentioned, the oil in the settling section to be in direct contact with the plate 31 which separates the settling chamber from the heating chamber. In this manner, the oil in the settling section can be maintained at a maximum temperature at all times, without having to transmit the heat across a body of water. The outlet from drain back pipe 43 is below the inlet to pipe 40 such that water drained back from the settling section into the heating section will further drain back into the free water knockout chamber 29 through the pipe 41.

In accordance with another novel aspect of this invention, the cold flume 30 extends over a major portion of the cross section of the tank and the outlet from the weir 23 is above the lower wall 38 of the flume, such that only a minor portion of the hot oil in the settling chamber has an exposed surface in the tank. Also, the hot oil is cooled at its upper surface by contact with the flume 30 which contains the relatively cool emulsion. This construction prevents light vapors which are on the verge of breaking out from doing so. In this respect, it will be noted that the side or vertical wall 44 of the cold flume extends upwardly in the tank to a point short of the upper edge thereof such that passage is provided between the settling chamber and the gas separation chamber above the upper edge of the cold flume. Not only is pressure thus equalized in the two chambers, but also hot vapors rising from the surface of the hot oil adjacent the weir 23 will be contacted by the substantially cold gas escaping from the separator shell 33 such that further condensation is promoted and additional light ends recovered to prevent loss of gravity from the crude.

Of course, the heating of lighter liquid in the heating chamber 28 will also liberate a certain amount of hot gas, as well as separating the oil and water. Due to the construction of the enlarged emulsion pipe 36 and its location in the heating chamber, such gas will pass upwardly therethrough into the gas separation chamber 26. In so passing upwardly through the relatively cold liquid, a further saving of light ends is obtained due to condensation thereof. Such gas as does escape from the upper end of the pipe 36 will pass into the mist extractor from which it is discharged outwardly of the tank through the gas outlet 12.

The passage of hot gas up through the conductor pipe 36 serves an additional purpose, inasmuch as the hot gas thus by-passes the settling chamber 27, whereby agitation in the settling chamber is prevented and effective separation of oil and water is permitted. As previously mentioned, this feature is peculiar to applicants' construction and represents a distinct improvement over prior art structures, wherein it is conventional to dispose of the gas by permitting it to bubble up through the hot oil in the settling chamber.

Water will be contained in the free water knockout chamber 29 in a relatively quiescent state such that oil remaining in the water will be caused to settle out and pass into the heating chamber 28 through a pipe 45. As shown in the drawings, the pipe 45 extends from the upper portion of the chamber 29 into the upper portion of the heating chamber 28 such that it will be caused to flow downwardly over the heater 39 before passing into the settling chamber 27, in a manner similar to the travel of lighter liquid through the pipe 36.

According to a further novel aspect of this invention, however, the lower end of the pipe 45 extends a short distance below the upper wall of the water chamber 29, as defined by the plate 32, whereby the lower edge of this pipe acts as a weir in forming a layer of lighter liquid between the plate 32 and the water contained in the chamber 29. This layer thus establishes an oil-water interface level, indicated by broken lines at 45a, between heated liquid in the chamber 28 and the water in the chamber 29, which layer serves to insulate the heated liquid against the relatively cold water, thus providing an additional fuel saving factor by preventing the absorption of heat by the water from the heating chamber. It will be noted that the outlet ends of both the pipe 35 and the pipe 41 are below the layer formed by the lower end of the pipe 45.

The lower outlet end of pipe 35 is cut away and provided with a deflector 45b which acts to change the direction of travel of water emerging from the pipe 35 and also to reduce agitation in the chamber 29 to a minimum. It will be understood that small particles of oil or emulsion may be carried with the water emerging from pipe 35 and, unless the flow of these particles is deflected, their momentum may carry them straight down to water outlet 14 and out of the tank.

The water outlet 14 is disposed in the lower portion of the water chamber 29 and connects with a vertically extending pipe 46 centrally disposed in the water siphon 21. It will be understood that the location of the uppermost edge of this vertical pipe 46 will determine the oil-water interface level 25 within the tank. For the purpose of changing this level in the field, the height of the upper edge of the pipe 46 may be adjusted as desired. Of course, the elevation of the plate 31 may be properly positioned within the tank 10 at the time of manufacture in order to insure that the oil-water interface level 25 is maintained below the plate and within pipes 35, 40, 43 and 45. Thus, when interface level 25 is maintained within pipe 40, the interface level 40a exteriorally of pipe 40 will always be at substantially the lower end of pipe 40. This assures that lighter fluid from pipe 36 is discharged downwardly to flow across the heater 39 before flowing upwardly through pipe 40.

Pressure equalization between the gas separating chamber 26 and the water siphon 21 is maintained by a pipe 47 which connects the two. As shown, the outlet of this pipe in the gas separation chamber is disposed in the upper portion thereof, and the outlet into the water siphon is disposed in a similar portion thereof. By means of a water valve 43 disposed between the water siphon 21 and water pipe 22, the level of water in the siphon annulus about the vertical pipe 46 is maintained below the level of the pressure equalization pipe 47.

Turning now to a description of the vertical heat exchanger 18, it can be seen from Figs. 1 and 6 that this structure merely includes a conduit 48 surrounding the conduit 16 in spaced relation thereto to provide an annulus 49 through which the cleaned hot oil may be conducted downwardly from the oil outlet 13 into the horizontal heat exchanger 17. It is thus apparent that emulsion entering the conduit 16 within the vertical heat exchanger 18 from the horizontal heat exchanger 17 will be conducted upwardly in heat exchange relation with the hot oil flowing downwardly in the annulus 49.

The horizontal heat exchanger 17 comprises two horizontally disposed cylinders 50 and 51 which are disposed one above the other and a third cylindrical portion 52 thereabove which serves to connect the vertical and horizontal exchangers. As shown in Fig. 6, each of the cylinders 50 and 51 includes longitudinally extending tubes 53 and spaced end plates 54 arranged with respect to the tubes 53 and extending across the cross section of the cylinders in a manner to conduct the cold emulsion entering the horizontal heat exchanger through conduit 15 to passage through the tubes and into the conduit 16 of the vertical treater, while directing the flow of hot separated oil around the tubes in heat exchange with the cold emulsion passing therethrough and outwardly of the horizontal heat exchanger 17 into the pipe 19 to a suitable place of disposal.

More particularly, the end plates 54 define at each opposite end of the cylinders 50 and 51 a chamber 55 which is in communication with the passage through the tubes 53 but prevented from communication with the space surrounding the tubes. As can be seen from Fig. 6, the pipe 15 conducts the cold emulsion into the chamber 55 at the right end of the cylinder 51, while a conductor 56 connects the chamber 55 at the left end of each of the cylinders 50 and 51. The chamber 55 on the right end of the upper cylinder 50 and the right end of the cylindrical portion 52 are connected by a conduit 57 and the conduit 16 is surrounded by an annular plate 58 which is connected to the cylindrical portion 52.

The plate 58 is connected to the portion 52 between the conduit 57 and a conduit 59 between the cylindrical portion 52 and the space surrounding the tubes 53 in upper cylinder 50. Also, a conduit 60 connects the space surrounding the tubes in the upper cylinder 50 with that space surrounding the tubes in the lower cylinder toward the opposite end of said cylinders from the conduit 59 and the pipe 19. Thus, it can be seen, as previously mentioned, that hot oil flowing downwardly in the heat exchanger 18 within the annulus 49 will pass through the conduit 59 and around the tubes in the cylinder 50 from substantially the rightmost end thereof to substantially the leftmost end, as indicated by the long arrows in Fig. 6. Toward the leftmost end of the cylinder 50, the hot oil travels downwardly through conduit 60 into the space surrounding the tubes in cylinder 51 from where it is conducted, again as indicated by the long arrows, toward the rightmost end of the cylinder 51 and outwardly of the heat exchanger 17 through the pipe 19.

On the other hand, cold emulsion entering through the conduit 15 follows a path through the chambers 55 and tubes 53 which is indicated by the shorter arrows. That is, the cold emulsion passes through the chamber 55 at the rightmost end of the cylinder 51 and through the tubes 53 of the cylinder to its leftmost end and chamber 55. From the cylinder 51 the cold emulsion flows upwardly through the conduit 56 into the chamber 55 in the leftmost end of the cylinder 50 and then through the tubes 53 in the cylinder 50 and into the chamber 55 at the rightmost end thereof. From the cylinder 50, the emulsion flows upwardly through conduit 57 and is directed into the conduit 16 by the plate 58, in a manner previously described.

Supports are provided between the cylindrical portion 52 and the cylinder 50 and also between the cylinders 50 and 51 as at 61 and 62, respectively. From the foregoing it will be appreciated that hot oil in this horizontal heat exchanger will be caused to cover all of the surfaces on one side of the heat exchange tubes 53 through which the cold emulsion is flowing.

In accordance with another practical aspect of this horizontal heat exchanger, one end of the cylinder 50 and the opposite end of the cylinder 51 are closed by removable bolting flanges 62a and 63, respectively. In this manner, when it is necessary to remove deposits on the inside of the tubes 53, the bolting flange 62 may be removed and a suitable cleaning instrument shoved through the tubes in the upper cylinder 50 to cause said deposits to be scraped from the inner walls of the tube and emptied into the leftmost chamber 55. It can thus be seen that such deposits removed from the tubes in the upper cylinder will either fall through or be washed through the relatively large conductor 56 into the chamber 55 in the leftmost end of the cylinder 51. This construction permits the bolting flange 63 to be removed and the deposits cleaned out of the chamber 55 in the leftmost end of the lower cylinder 51. Removal of the bolting flange 63 also permits a cleaning instrument to be inserted through the tubes 53 in the lower cylinder 51 to shove the deposits through these tubes and into the chamber 55 on the rightmost end of the lower cylinder, from which said deposits may be washed through the conduit 55 during a cleaning operation.

It will be further understood that many portions of the treater of this invention are shown diagrammatically. For example, certain access manways and drainage ports have not been shown. Also, the details of the heater 39 have not been shown and the manner in which the heater is mounted with respect to the tank has been shown only diagrammatically in Fig. 5. However, these details are not a part of this invention and may be accomplished in accordance with conventional practices. It will be further appreciated that certain of the valves which are shown in the drawings are represented merely diagrammatically, and may take any form suitable for the purposes desired.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An emulsion treater comprising, an upright tank, first, second and third vertically spaced chambers in the tank, an inlet from the exterior of the tank for introducing emulsion into the first chamber to initially separate a lighter liquid from a heavier liquid and gas of the emulsion, a heater in the second chamber, vertically disposed conduit means for conducting the initially separated lighter liquid from said first chamber to an outlet in the second chamber above the heater to accomplish a further separation of lighter and heavier liquid, outlet means having an inlet below the heater in the second chamber for removing therefrom the lighter liquid separated by heating, conduit means for conducting separated heavier liquid into the third chamber, means forming a layer of lighter fluid between the second and third chambers, a gas outlet from the first chamber, and outlet means for removing heavier liquid from the third chamber and for maintaining a lighter-heavier liquid interface in the heating chamber exteriorally of the first-mentioned outlet means at a level below the heater and above said third chamber.

2. An emulsion treater of the character defined in claim 1, wherein a plate extends laterally across the tank below the second chamber and above the third to separate the same, and the layer forming means comprises a conduit through the plate communicating upper portions of the second and third chambers and having its lowermost end extending into the third chamber below the plate.

3. An emulsion treater of the character defined in claim 1, the conduit means for conducting heavier liquid into the third chamber including a conduit directly connecting the first and third chambers for conducting the initially separated heavier liquid from the first into the third chamber, and a conduit connecting the second and third chambers for conducting heavier liquid separated in the second chamber into the third chamber, the lower end of said last-mentioned conduit being at a level in the third chamber below the layer of lighter liquid.

4. An emulsion treater of the character defined in claim 3, said chambers being arranged in substantially superimposed relation within the tank and being separated from one another by plates extending laterally thereacross, and said layer forming means comprising a conduit through the plate separating the second and third chambers and having its lowermost end extending into the third chamber below the plate but above the lowermost end of the conduit connecting the second chamber with the third chamber.

5. An emulsion treater comprising, an upright tank, a cold flume within the upper portion of the tank and extending across a substantial portion of the cross section of the tank to define a passage between the flume and tank, an inlet from the exterior of the tank for introducing emulsion into the flume to effect an initial separation of gas from liquid in the emulsion, a gas outlet from the flume, a plate extending across the tank cross section below the cold flume to define a settling chamber between the cold flume and plate and a heating chamber beneath the plate, a heater in the heating chamber, conduit means having a first inlet disposed to receive liquid from the cold flume and a first outlet in the upper portion of the heating chamber and also having a second inlet disposed to receive liquid from the lower portion of the heating chamber and a second outlet into the settling chamber, said first outlet being at a higher level than said second inlet whereby liquid is caused to flow from the flume downwardly across the heater to separate the same into heavier and lighter phases, a heavier liquid outlet from the heating chamber and tank, and a lighter liquid outlet from the tank above the lower end of the flume and within the passage between the flume and tank.

6. An emulsion treater comprising, an upright tank, a gas separating chamber, a plate extending across the tank to define a heating chamber therebelow and a settling chamber thereabove, an inlet from the exterior of the tank for introducing emulsion into the gas separating chamber to separate gas from liquid in the emulsion, a gas outlet from the gas separating chamber, a conduit connecting the gas separating chamber with the heating chamber for conducting liquid into the latter, a heater in the heating chamber, a conduit extending through the plate to connect the heating and settling chambers and arranged such that the liquid conducted into the heating chamber flows across the heater to thereby separate oil and water and cause the oil to be conducted upwardly into the settling chamber, outlet means from the heating chamber and tank for the water, an outlet from the settling chamber for the oil, means for maintaining an oil-water interface level in the tank below the plate, and conduit means having an inlet substantially flush with the upper side of said plate and an outlet communicating with the water outlet means, whereby water separating out in the settling chamber will be quickly removed therefrom and oil in said chamber will be in direct contact with the plate between the settling and heating chambers.

7. An emulsion treater, comprising an upright tank, a partition dividing the tank into a gas separation chamber above a heating chamber, an inlet connecting the exterior of the tank with the gas separation chamber for introducing emulsion thereinto to initially separate the emulsion into gas and liquid phases, a gas outlet from the gas separation chamber, a heater in the heating chamber, vertically extending conduit means through the partition providing the only direct connection between said chambers, the inlet of said conduit means being at a level within the gas separation chamber to receive the initially separated liquid and the outlet of said conduit means being at a level lower than its inlet and within the heating chamber above the heater, first liquid outlet means from the heating chamber and tank having inlet means within the heating chamber located at a level below the heater for causing the initially separated liquid to flow downwardly over the heater, and second liquid outlet means from the tank for removing water therefrom and for maintaining an oil-water interface in the heating chamber exteriorally of said first liquid outlet means at a level below the upper extremity of said heater.

8. An emulsion treater, comprising an upright tank, partitions dividing the tank into a gas separation chamber above a heating chamber and a settling chamber intermediate the gas separation and heating chambers, an inlet connecting the exterior of the tank with the gas separation chamber for introducing emulsion thereinto to initially separate the emulsion into gas and liquid phases, a gas outlet from the gas separation chamber, a heater in the heating chamber, a vertically disposed first conduit connecting the gas separation and heating chambers for conducting liquid into the latter, a vertically disposed second conduit connecting the heating chamber with the settling chamber, the outlet from and inlet to said first and second conduits, respectively, being positioned at levels above and below the heater to cause flow of the initially separated liquid across the heater in passing from said first to said second conduit so as to separate said liquid into lighter and heavier phases, an outlet from the settling chamber, and means for maintaining a lighter and heavier liquid phase interface level within said second conduit at a point below the partition dividing the settling chamber from the heating chamber.

9. An emulsion treater, comprising a tank having a gas separation chamber above a heating chamber and divided therefrom by an imperforate partition extending across the tank, an inlet from the exterior of the tank for introducing emulsion into the gas separtion chamber to initially separate the emulsion into gas and liquid phases, a gas outlet from the gas separation chamber, a heater in the heating chamber, a conduit connecting the gas separation chamber with the heating chamber and having an inlet in the gas separation chamber positioned to receive the initially separated liquid, an outlet means in the heating chamber positioned to cause flow of the initially separated liquid across the heater prior to its removal from the tank, said conduit providing the only direct connection between the gas separation and heating chambers and having an outlet into the heating chamber substantially flush with the underside of said partition and above the heater to facilitate the passage upwardly through the conduit of gas separated from liquid in the heating chamber with the gas flowing in countercurrent contact with initially separated liquid flowing downwardly in said conduit from the gas separation chamber.

10. An emulsion treater comprising, an upright tank, first, second and third chambers in the tank, an inlet from the exterior of the tank for introducing emulsion into the first chamber to initially separate a lighter liquid from a heavier liquid and gas of the emulsion, a heater in the second chamber, conduit means for conducting the initially separated lighter liquid from said first chamber to an outlet in said second chamber above the heater for downward flow across the heater to accomplish a further separation of lighter and heavier liquid, outlet means having an inlet in the second chamber below the heater for conducting from the tank the lighter liquid separated by heating, conduit means having an inlet in the second chamber below the inlet to said outlet means for conducting separated heavier liquid from the second chamber to the third chamber, means forming a layer of lighter fluid between the second and third chambers, a gas outlet from the first chamber, and a heavier liquid outlet from the third chamber.

11. An emulsion treater comprising a tank having a gas separating chamber, a settling chamber below the gas separating chamber and a heating chamber below the settling chamber, means preventing gas separated in the heating chamber from flowing into the settling chamber, an emulsion containing stream inlet to the gas separating chamber from the exterior of the tank, a gas outlet from the tank, a heater in the heating chamber, a conduit by-passing the the settling chamber and having an inlet to receive liquid initially separated in the gas separating chamber and an outlet in the heating chamber at said gas flow preventing means and positioned above the heater so that gas separated in said heating chamber flows upwardly through said conduit to the gas separating chamber and countercurrent to liquid flowing from such chamber to the heating chamber, and outlet means from the heating chamber positioned to cause flow of initially separated fluid from the outlet of said conduit across said heater.

12. An emulsion treater comprising a tank, a gas separating chamber in the upper part of the tank, an imperforate partition below the gas separating chamber defining a heating chamber therebelow and a settling chamber thereabove, an emulsion inlet to the gas separating chamber, a first conduit having an inlet in the gas separating chamber to receive liquid therefrom and an outlet terminating substantially flush with the underside of said partition to prevent gas from accumulating at the underside of said partition, and flow means for conducting heated liquid from the heating chamber to the settling chamber and also for conducting water separating in the settling chamber from the settling chamber, the flow means having an inlet for receiving said water with the inlet being substantially flush with the upperside of said partition, and means for maintaining an oil-water interface below said partition, whereby heat can be transferred across said partition without having to cross a layer of water or a layer of gas.

References Cited in the file of this patent

UNITED STATES PATENTS

| | | |
|---|---|---|
| 1,628,574 | Brady | May 10, 1927 |
| 2,319,962 | Walker | May 25, 1943 |
| 2,366,302 | Welch | Jan. 2, 1945 |
| 2,522,429 | Buchan | Sept. 12, 1950 |
| 2,528,032 | Candler et al. | Oct. 31, 1950 |
| 2,546,269 | Lovelady | Mar. 27, 1951 |
| 2,601,903 | Erwin | July 1, 1952 |
| 2,601,904 | Erwin | July 1, 1952 |
| 2,610,698 | Lovelady et al. | Sept. 16, 1952 |
| 2,614,649 | Walker et al. | Oct. 21, 1952 |
| 2,619,187 | Hayes et al. | Nov. 25, 1952 |
| 2,751,998 | Glasgow | June 26, 1956 |